United States Patent
Block et al.

(10) Patent No.: US 7,831,485 B2
(45) Date of Patent: *Nov. 9, 2010

(54) FLEXIBLE MAGAZINE MANAGEMENT SERVICE

(75) Inventors: Milton J. Block, Naples, NY (US); Steven M. Sachs, Brooklyn, NY (US)

(73) Assignee: Time, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/219,884

(22) Filed: Jul. 30, 2008

(65) Prior Publication Data

US 2009/0043642 A1  Feb. 12, 2009

Related U.S. Application Data

(63) Continuation-in-part of application No. 11/507,515, filed on Aug. 22, 2006.

(60) Provisional application No. 60/710,178, filed on Aug. 23, 2005.

(51) Int. Cl.
G06F 17/30 (2006.01)
G07F 7/00 (2006.01)

(52) U.S. Cl. .............. 705/27; 705/28; 705/10; 705/14; 705/35; 235/375

(58) Field of Classification Search ............ None
See application file for complete search history.

(56) References Cited

U.S. PATENT DOCUMENTS

| | | | |
|---|---|---|---|
| 5,819,032 A * | 10/1998 | de Vries et al. | 709/250 |
| 5,970,470 A | 10/1999 | Walker et al. | |
| 6,415,262 B1 | 7/2002 | Walker et al. | |
| 7,280,978 B1 * | 10/2007 | Joao | 705/16 |
| 7,562,032 B2 * | 7/2009 | Abbosh et al. | 705/26 |
| 7,613,631 B2 * | 11/2009 | Walker et al. | 705/16 |
| 2002/0010611 A1 * | 1/2002 | Yamaji et al. | 705/8 |
| 2002/0103922 A1 * | 8/2002 | Arend et al. | 709/234 |
| 2003/0065642 A1 * | 4/2003 | Zee | 707/1 |

OTHER PUBLICATIONS

Amazon.com Kindle Website: http://www.amazon.com/kindle, printed on Jul. 30, 2008.
Amazon.com Magazine Website: http://www.amazon.com/magazines, printed on Jul. 30, 2008.
Barnes & Noble Magazine Website: http://www.bn.com/magazines, printed on Jul. 30, 2008.
Magazines.com Website: http://www.magazines.com, printed on Jul. 30, 2008.

(Continued)

*Primary Examiner*—F. Zeender
*Assistant Examiner*—Luna Champagne
(74) *Attorney, Agent, or Firm*—Finnegan, Henderson, Farabow, Garrett & Dunner, LLP (57) ABSTRACT

A method for managing a magazine subscription management service is disclosed. A magazine package is associated with a consumer, wherein the package includes a price based on a number of magazines in the package. Selections for the number of magazines are received from a consumer, each selected magazine having a corresponding publication frequency including a number of issues and a period for delivery. Distribution of issues of each of the selected magazines according to the corresponding publication frequency is enabled.

16 Claims, 9 Drawing Sheets

OTHER PUBLICATIONS

Texterity Website: http://www.texterity.com, printed on Jul. 30, 2008.
Zinio Website: http://www.zinio.com, printed on Jul. 30, 2008.
Speedymags Website: http://www.speedymags.com, printed on Jul. 30, 2008.
Subscription Offers Website: http://www.subscription-offers.com, printed on Jul. 30, 2008.
Mags for Less Website: http://www.magsforless.com, printed on Jul. 30, 2008.
Mags 4 Cheap Website: http://www.mags4cheap.com, printed on Jul. 30, 2008.
Magazines USA Website: http://www.magazinesusa.com, printed on Jul. 30, 2008.
International Search Report and Written Opinion mailed Jan. 2, 2008, for PCT application No. PCT/US06/32996.

* cited by examiner

FLEXIBLE MAGAZINE MANAGEMENT SERVICE

RELATED APPLICATION

This application is a continuation-in-part of U.S. patent application Ser. No. 11/507,515, filed Aug. 22, 2006, which claims the benefit of priority under 35 U.S.C. §119(e) of provisional U.S. patent application No. 60/710,178, filed Aug. 23, 2005, both of which are incorporated herein by reference.

FIELD OF THE INVENTION

The present invention relates generally to magazine sales and, more particularly, to methods and systems for providing a flexible magazine management service.

BACKGROUND OF THE INVENTION

The magazine industry has experienced a steady growth over the last few years. This industry has used different ways to advertise magazines, and has also provided different methods for people to subscribe to and receive magazines. Some of the advertising has included direct marketing via the mail and over the telephone, commercials on television and radio, print advertisements in newspapers and magazines, and online advertisements via the Internet. Consumers may subscribe to magazines through the mail, over the phone, and over the Internet. Frequently, however, a long subscription period, such as one year, is required for each subscription. Consumers may feel locked into receiving the magazine for the duration of the subscription period. Even worse, consumers cannot easily cancel their magazine subscriptions or determine when a subscription will expire, and may have to wait on hold with telephone consumer service representatives to cancel their subscriptions, or even to check the status of their subscriptions.

These commitments, coupled with rising costs of subscriptions, cause difficulty for consumers, especially for consumers with multiple subscriptions. Further, while some magazines accept subscriptions via online services, conventional online magazine subscription services suffer from several disadvantages. For example, each magazine subscription generally requires a consumer to manage each individual subscription, and to keep track of different subscription durations, contract terms, bills, contacts, and renewal notices. These conventional systems may be particularly cumbersome for individuals and households that subscribe to multiple magazines. Further, generic services operated by offline, third-party magazine agents have no brand recognition, and, therefore, are not easily trusted by consumers.

Accordingly, there exists a need for a flexible magazine management service that will enable users to consolidate multiple magazines from different publishers into one account, and to pay for a magazine package with a recurring flat fee.

SUMMARY

Embodiments of the invention provide a method for managing a magazine subscription service. A magazine package is associated with a consumer, wherein the package includes a price based on a number of magazines in the package. Selections for the number of magazines are received from the consumer, each selected magazine having a corresponding publication frequency including a period for delivery. Distribution of issues of each of the selected magazines according to the corresponding publication frequency is enabled.

Other embodiments of the invention provide a method for managing a magazine management service. A selection for one of a plurality of magazine packages is received from a consumer, wherein each of the plurality packages include a price based on a number of magazines in the package. The selected package is associated with the consumer, and selections for the number of magazines are received from the consumer, each selected magazine having a corresponding publication frequency including a number of issues and a period for delivery. Distribution of issues of each of the selected magazines according to the corresponding publication frequency is enabled. The consumer may select a subset of the number of issues in the period for delivery. Distribution of the selected subset of issues of each of the selected magazines according to the corresponding publication frequency is then enabled.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

A flexible magazine management service enables consumers to consolidate all of the subscriptions in their households in one account, and pay for them via a recurring flat fee, as a result, improving consumers' experience of subscribing to magazines. Consumers may save time by choosing tiers or packages of magazines, and the number of magazines the consumer receives each month depends on the package selected: for $7 per month, the consumer gets 3 magazines, for $12 per month, the consumer gets 5 magazines, etc. Each package may contain certain magazines, for example, based on distribution period, topic, or cover price, creating value for the consumer. The account may be billed like cable or other utilities, giving the consumer the ability to cancel at any time, hassle free, yet giving the consumer flexibility by eliminating the constraints of a contract. Consumers may also receive free issues of magazines they have never subscribed to and would like to try, for example, using a queue or wish list. The flexible magazine management service may automatically send consumers their top sample selections each month, or may suggest magazines or article samples for the consumers based on previous selections. In addition, consumers may easily send magazines to other recipients (e.g., send gifts to family members), change their package levels, send payments, select magazine titles, update wish lists, edit personal information, and manage other information using their single account. One skilled in the art will recognize that users may receive magazines with no specified term for a subscription, and without establishing subscription contracts.

Figure 1:
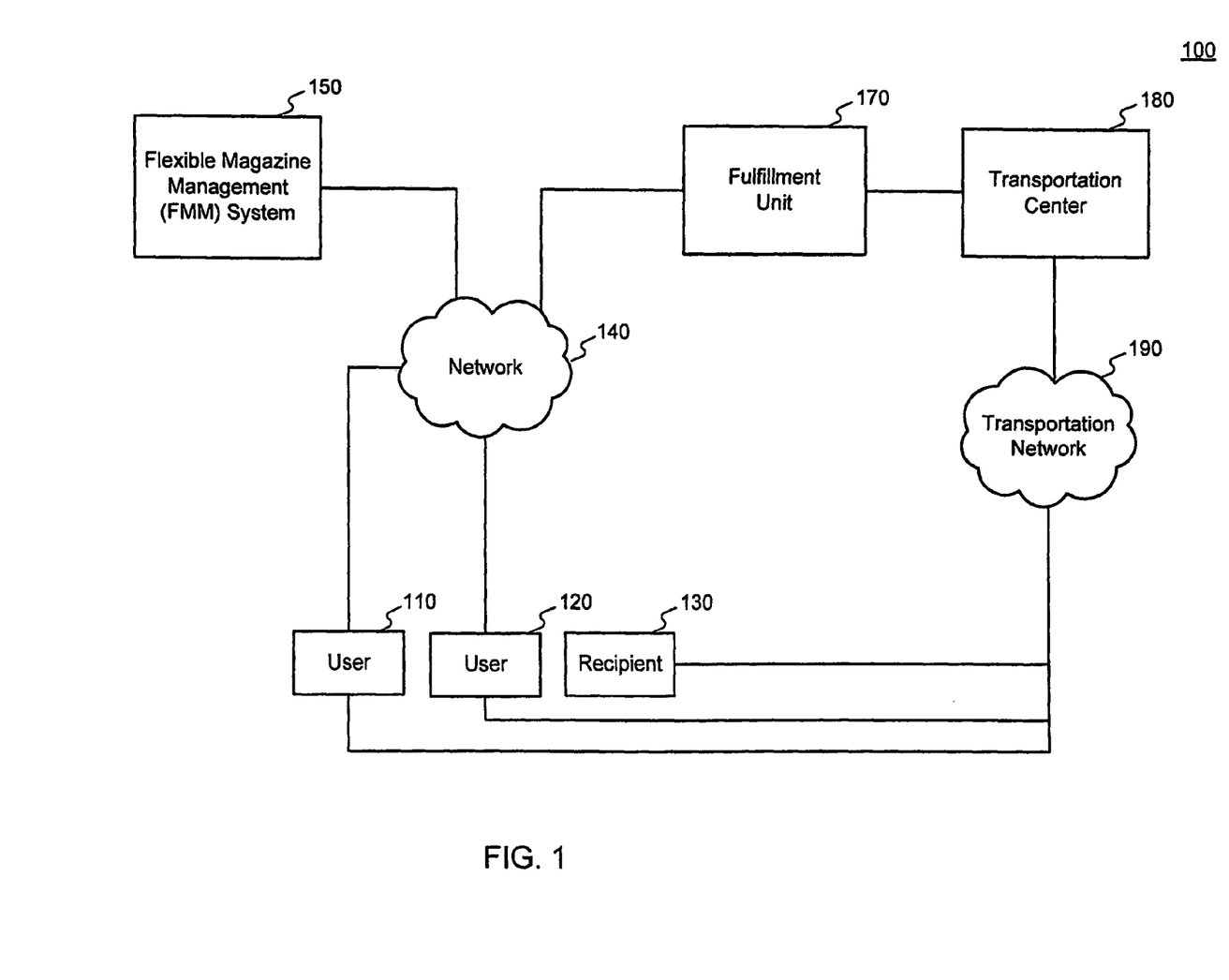
FIG. 1 is a block diagram illustrating a flexible magazine management service, consistent with embodiments of the present invention.

FIG. 1 is a block diagram illustrating a flexible magazine management service 100. Service 100 includes users 110 and 120, a recipient 130, a network 140, a flexible magazine management (FMM) system 150, a fulfillment unit 170, a transportation center 180, and a transportation network 190. Users 110 and 120 are individuals or entities, such as households or medical offices, wishing to order magazine subscriptions. Users 110 and 120 may use a network connection device (not shown) to connect to network 140. The device may include, for example, a personal computer, a laptop, or a handheld device. In addition, any device capable of connecting to and transferring information across the network 140 may be used.

FMM system 150 provides flexible, dynamic magazine management services to individuals and groups of users via, for example, network 140. FMM system 150 includes firewalls, routers, switches, websites, web servers, databases, software applications, and application servers. In addition, FMM system 150 may use other computing devices or software that may aid in providing a flexible magazine management service. Users 110 and 120 and FMM system 150 may connect to network 140 through any medium. For example, the connection mediums may include copper wires, twisted pair, optical fiber, and wireless interfaces. In one example, network 140 may be the Internet. Users 110 and 120 and FMM system 150 may obtain accesses to network 140 through an Internet Service Provider (ISP).

Figure 8:
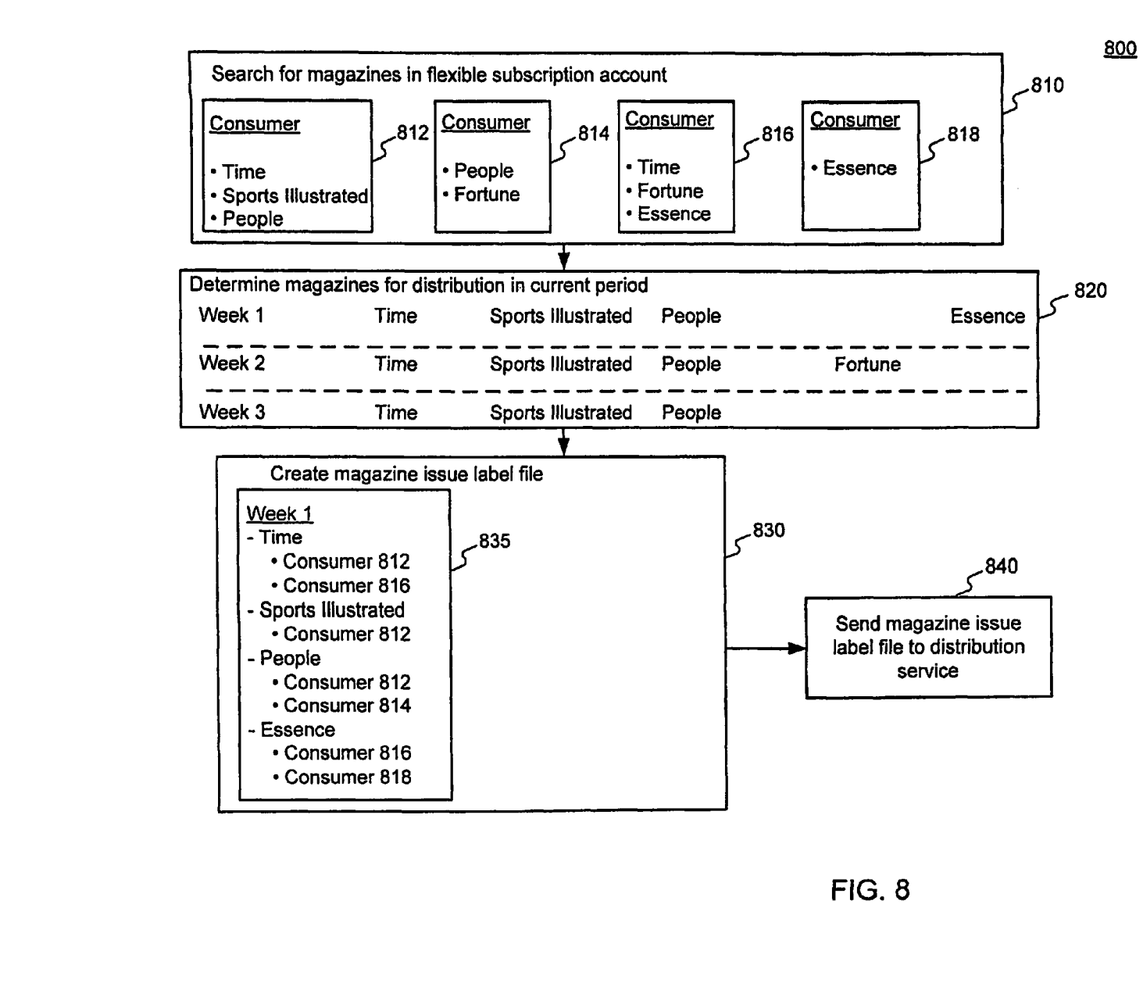
FIG. 8 is a flowchart illustrating an exemplary process of creating a magazine issue label file, consistent with embodiments of the present invention.

FMM system 150 may generate a magazine issue label file, described in greater detail below with respect to FIG. 8, or other form of magazine subscription data, and send it to fulfillment unit 170 through network 140. In certain embodiments where fulfillment unit 170 is operated by a third party, network 140 may be the Internet, telephone networks, or postal networks. Using the data, fulfillment unit 170 processes subscriptions that are ready for distribution and delivers magazines to individuals and entities. Fulfillment unit 170 may process the magazine issue label file or other form of magazine subscription data and package magazines for distribution. Fulfillment unit 170 may include personnel and equipment that may be used in processing a magazine issue label file or other form of magazine subscription data and packaging magazines for shipping. The personnel may include data entry operators, order processing clerks, supervisors, and managers, and the equipment may include computers and packaging machines.

Transportation center 180 may take processed and packaged magazines from fulfillment center 170 and send them to users 110 and 120 and recipient 130 through transportation network 190. Transportation center 180 may include personnel and equipment that may be used in loading, transporting, and unloading processed and packaged magazines. Transportation center 180 personnel may include truck drivers, equipment operators, supervisors, and managers. Equipment may include forklifts and dollies, for example. Transportation network 190 may include airports, ports, roads, railroad, airways, and waterways. One skilled in the art will recognize that service 100 may include any number of users, recipients, FMM systems, fulfillment units, and transportation centers.

In one embodiment, users 110 and 120 may access FMM system 150 to create and manage user accounts. Users 110 and 120 may select one or more magazines to be delivered to themselves or to recipient 130. In certain embodiments, recipient 130 may receive magazines without accessing FMM system 150. For example, user 110 may be recipient 130's mother. User 110 subscribes to Time™, Sports Illustrated™, and People™ magazines using a flexible magazine management service. User 110 designates the recipient for her Time™ magazine as her son, recipient 130, for example by changing the mailing address for her Time™ magazine subscription to her son's college dormitory address, and within a week or two, recipient 130 starts receiving a Time™ magazine issue. In certain embodiments, FMM system 150 may deliver magazines or other notices to users 110 and 120 or to recipient 130 online, for example via network 140.

Figure 2:
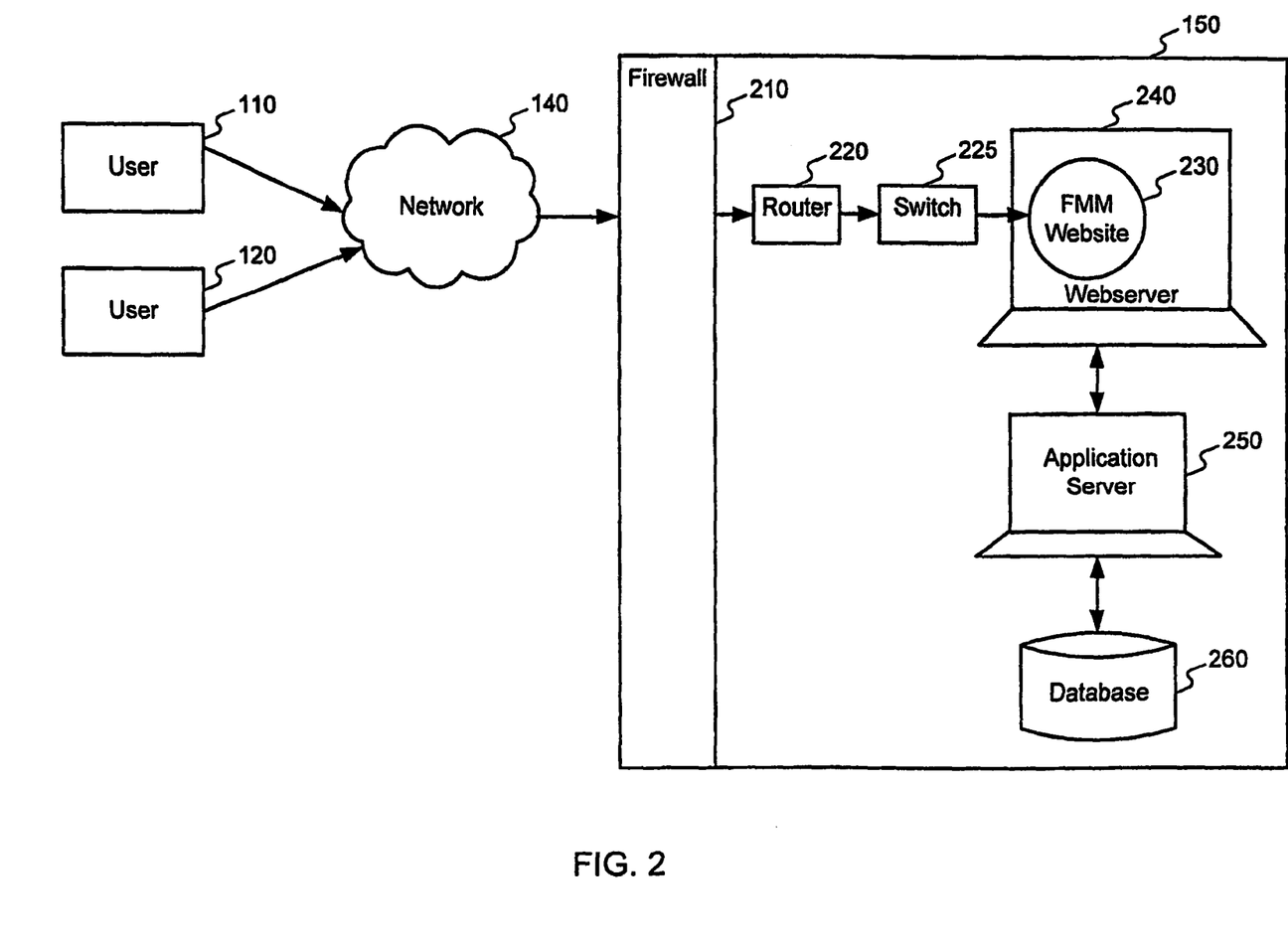
FIG. 2 is a block diagram illustrating a flexible magazine management system, consistent with embodiments of the present invention.

FIG. 2 illustrates an exemplary FMM system. FMM system may include a firewall 210, a router 220, a switch 225, a flexible magazine management (FMM) website 230 running on a web server 240, an application server 250, and a database 260. Users 110 and 120 may use a web browser running on their computers to send hypertext transfer protocol (HTTP) requests to FMM system 150 through Network 140. In addition, other types of application layer protocols may be used. In one embodiment, requests may be intercepted by firewall 210. Firewall 210 may filter the requests based on source IP address/port, destination IP address/port, protocols, time to live (TTL) values, and other IP-packet attributes. Router 220 and switch 230 may direct the requests to FMM website 230 running on web server 240.

Web server 240 may be Apache HTTP Server™, Internet Information Services (IIS)™, or Sun Java System Web Server™, for example. One skilled in the art will recognize that web server 240 may be any type of known web server. FMM website 230 may be a transactional website with help of application server 250 and database 260. Interaction with FMM website 230 may be independent of other transactions. Business components (i.e., components with business rules) and web components (i.e., components that generate dynamic contents of websites) may reside and run on application server 250. One skilled in the art will recognize that application server 250 may be any known application server. In certain embodiments, web server 240 may function as both a web server and an application server without the need of application server 250. In other embodiments, application server 250 may function as both an application server and a web server without the need of web server 240.

Application server 250 may store data in database 260. One skilled in the art will recognize that database 260 may be any known database. Although web server 240, application server 250, and database 260 appear in FIG. 2 as three separate physical machines, any combination of web server 240, application server 250, and database 260 may run on a single physical machine. One skilled in the art will recognize that FMM system 150 may include any number of firewalls, routers, switches, websites, web servers, application servers, and databases.

Figure 3:
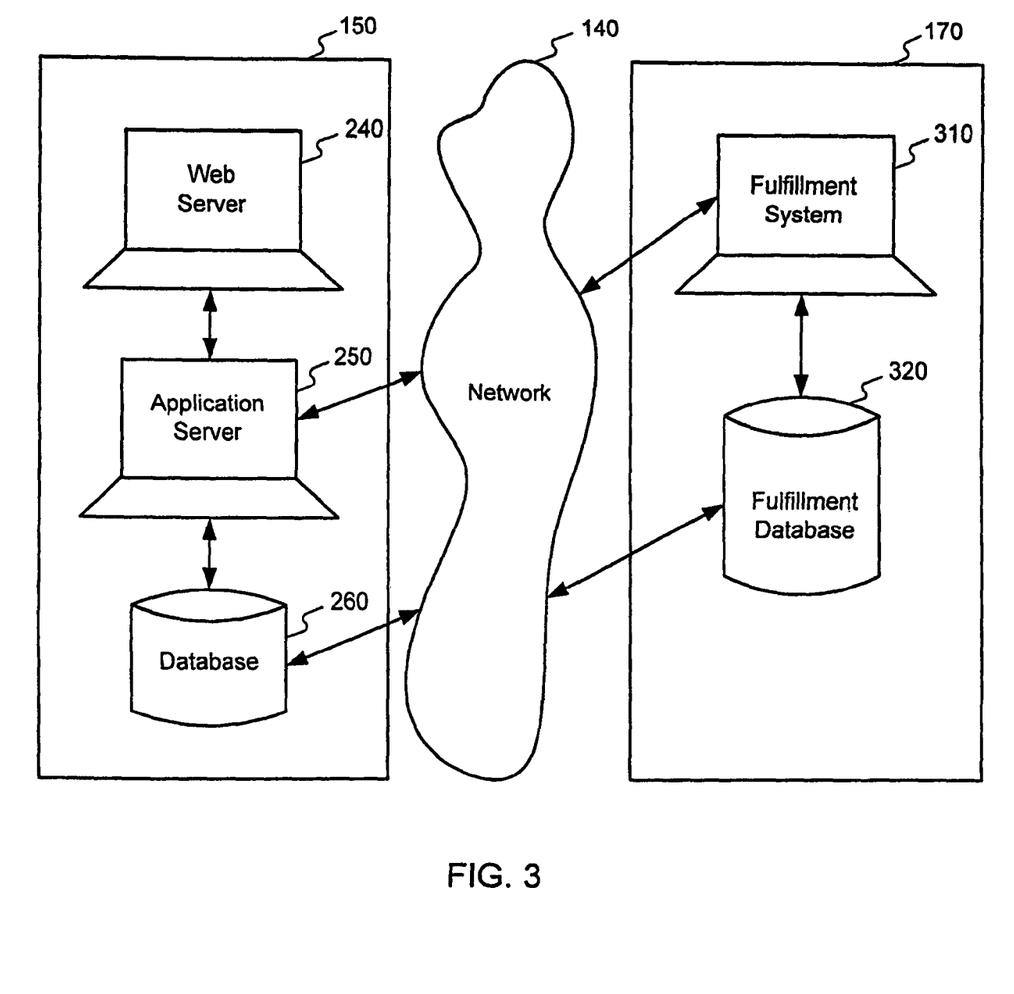
FIG. 3 is a block diagram illustrating communication flow between a flexible magazine management system and a fulfillment unit, consistent with embodiments of the present invention.

FIG. 3 illustrates communication flow between FMM system 150 and fulfillment unit 170, connected by network 140, in embodiments where both FMM system 150 and fulfillment unit 170 are operated by a single entity. As shown in FIG. 3, FMM system 150 contains a web server 240, an application server 250, and a database 260. Fulfillment unit 170 contains a fulfillment system 310 and a fulfillment database 320. Fulfillment system 310 represents computer hardware and software that may be used to process a magazine issue label file or other form of magazine subscription data to package magazines for distribution. Business components residing and running on application server 250 may be responsible for creating a magazine issue label file in the beginning of each distribution period. In one embodiment, after a magazine issue label file is created, application server 250 may send the label file to fulfillment system 310 through network 140 via a communication signal, for example.

Database 260 may store subscription data from application server 250. Fulfillment database 320 may store fulfillment data in fulfillment system 310. Subscription data in database 260 and fulfillment data in database 310 may need to be synchronized in certain embodiments. This synchronization may be performed using network 140, for example.

FMM website 230 provides 24-hour access for users to manage their accounts, browse for new magazines, place gift orders, submit orders, cancel magazines, change personal data, etc. Users may access customer service for the flexible magazine management service via FMM website 230 and by other electronic means, including email, instant messaging, and internet chat. The flexible magazine management service also provides wireless account management, wherein a user may access his account by devices such as a cell phone, personal data assistant, and smart phone.

Users may submit through FMM website 230 a review of a magazine managed by the flexible magazine management service, and may read reviews on FMM website 230 that were submitted by other users.

Figure 4:
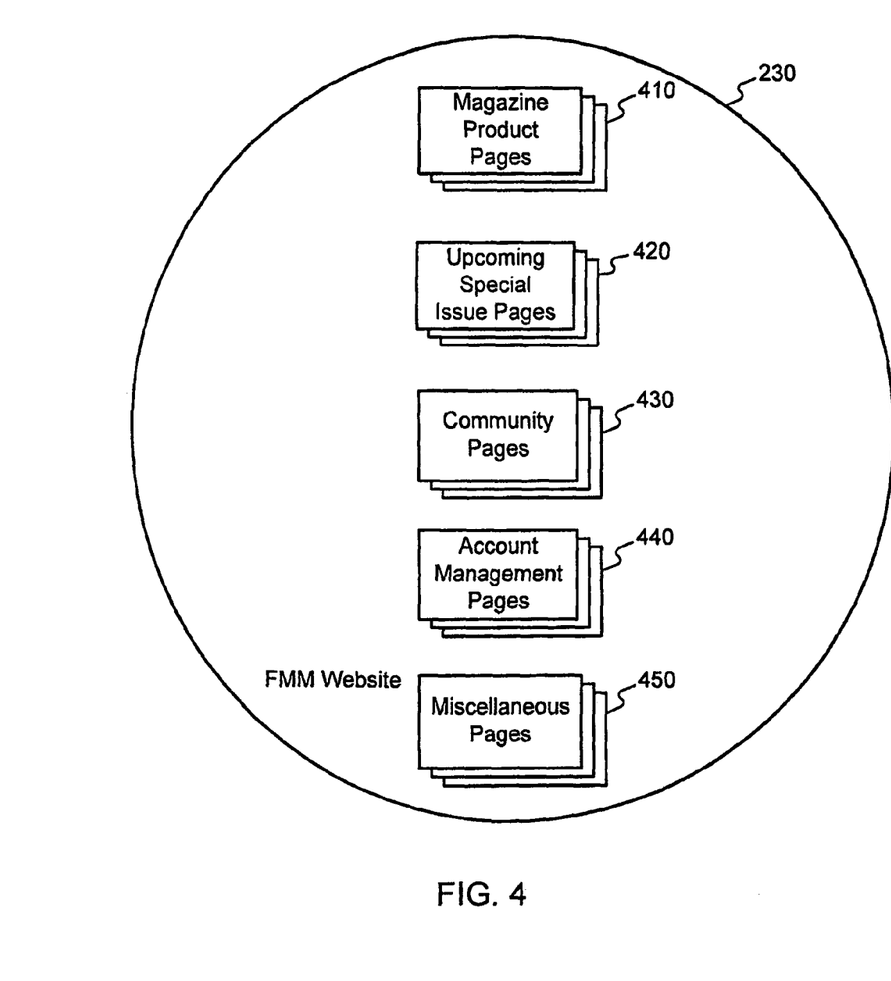
FIG. 4 is a block diagram illustrating an exemplary flexible magazine management website, consistent with embodiments of the present invention.

FIG. 4 illustrates an exemplary FMM website 230. In one exemplary embodiment, FMM website 230 may provide a central location for users 110 and 120 to access, manage, and share subscription data, user account data, and other data. FMM website 230 may include various pages, such as magazine product pages 410, upcoming special issue pages 420, community pages 430, account management pages 440, and miscellaneous pages 450. Magazine product pages 410 may include, for example, descriptions of magazines, current magazine covers, magazine newsstand prices, magazine publishing frequency, details on next available issues, back issue cover images, links to back issue order pages, article search, excerpts of editorial features, single copy ordering ability, and sample pages. Upcoming special issue pages 420 may include, for example, upcoming special issue covers and descriptions of the special issues. Community pages 430 may include, for example, user rating features, chat rooms, bulletin boards, and similar product recommendation features. Account management pages 440 may include pages that allow users to manage accounts, for example, to update their billing information, email addresses, password, payment methods, payment information, and other account information. Account management pages 440 may also include, for example, pages that allow users to view previous magazine selections, previous sample selections, billing and payment history, and other account information. Miscellaneous pages 450 may include log on/out pages, error pages, and other miscellaneous pages. One skilled in the art will recognize that FMM website 230 may contain other pages for use in the flexible magazine management service.

Figure 5:
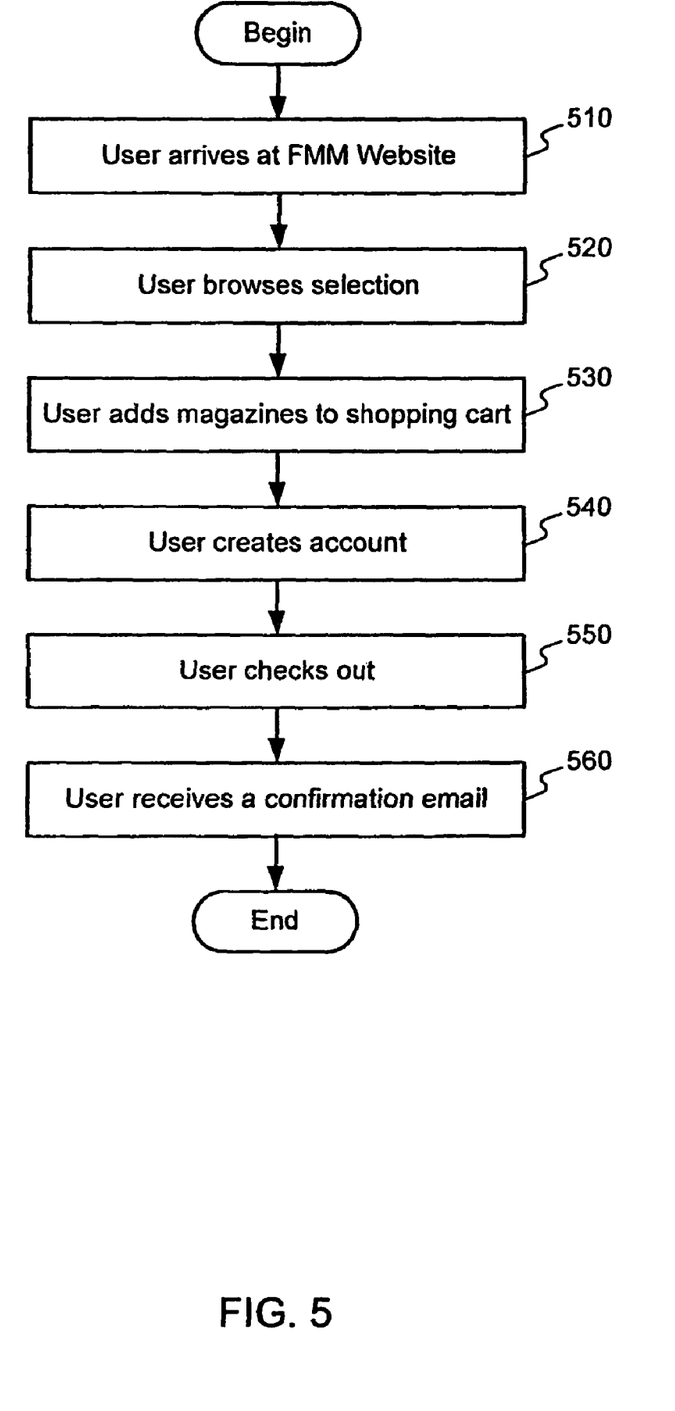
FIG. 5 is a flowchart illustrating an exemplary process for creating an account the flexible magazine management service of FIG. 1, consistent with embodiments of the present invention.

FIG. 5 is a flowchart of an exemplary process 500 for creating a flexible user account for FMM service 100. When a user arrives at FMM website 230 (step 510), the user may browse for magazines, for example using magazine product pages 410 on FMM website 230 (step 520). In certain embodiments, users may search magazines, for example, by title, category, price, content, topic, publishing frequency, new magazines, popularity, writer, photographer, and subject. The user may add magazine titles to a shopping cart to possibly order (step 530). In certain embodiments, the user may create a flexible magazine management account (step 540). The account may allow a user to manage all magazine subscriptions with just one bill. For example, users may consolidate subscriptions in their households in one account and pay for them with one flat monthly fee.

In creating the account, the user may select, for example, a username and a password, and provide FMM website 230 with a name, a billing address, delivery address(es), recipient(s), email address(es), and payment method(s) (e.g., credit card information, check card information, or bank account information). In one embodiment, the user may choose a magazine package tier service level, as described in more detail below with respect to FIG. 7. In certain embodiments, the user may send magazines to multiple delivery addresses, for example by designating various recipients or by providing multiple shipping addresses for certain magazines.

In certain embodiments, FMM system 150 may bill the user account for a flat fee, for example at a reoccurring period. For example, users may receive bills monthly, with no specified term for the subscription, and without establishing subscription contracts.

After creating an account, the user may check out (step 550), for example by signing out of their account, closing FMM website 230, or otherwise completing their transaction. In one embodiment, FMM system 150 may send a confirmation email to the user to verify the selections and account information (step 560).

Figure 6:
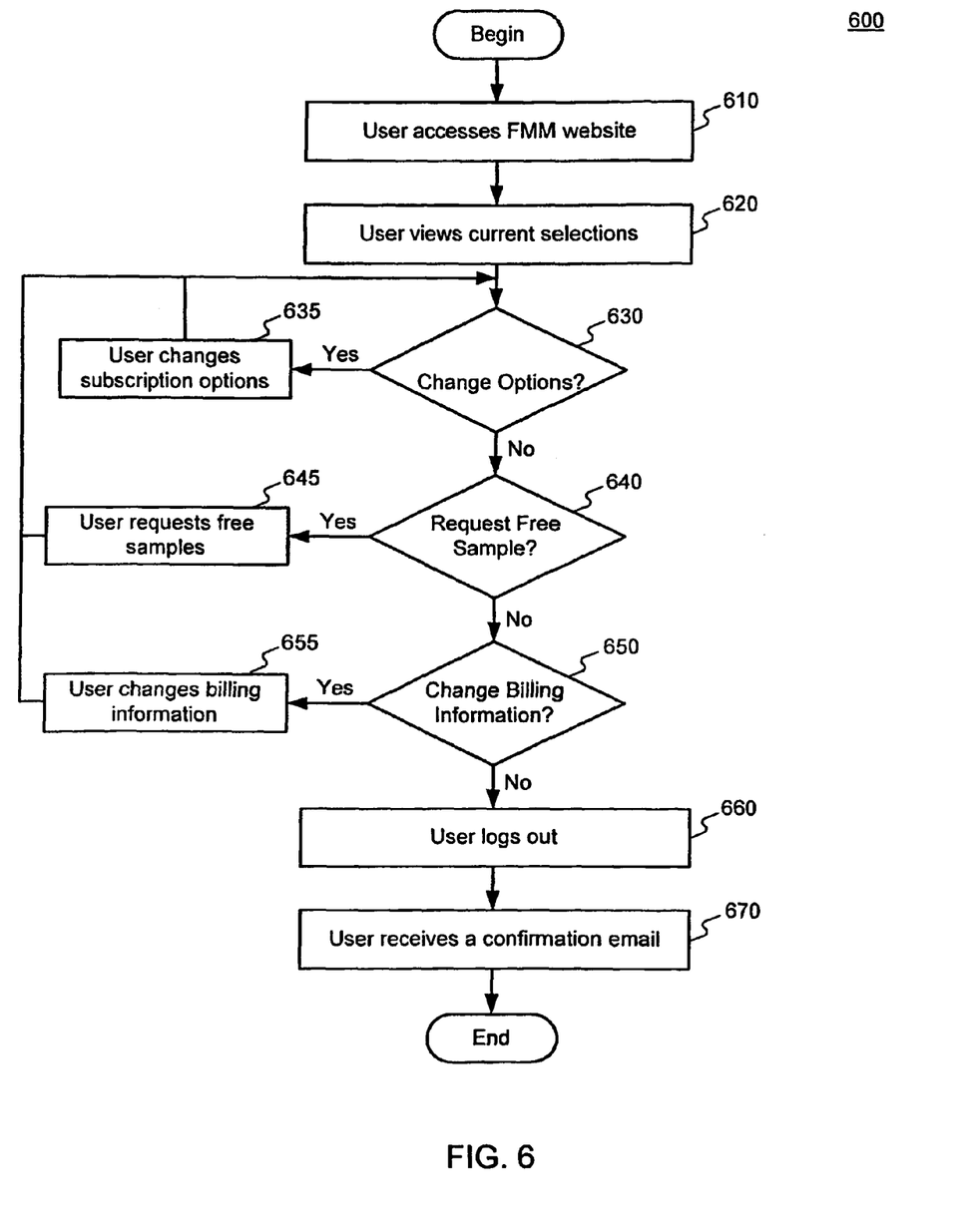
FIG. 6 is a flowchart illustrating an exemplary process for managing an account of the flexible magazine management service of FIG. 1, consistent with embodiments of the present invention.

FIG. 6 is a flowchart of an exemplary process 600 for managing subscriptions. A user arrives at FMM website 230 (step 610). In one embodiment, the user may provide FMM website 230 with a username and password to log in, which may have been previously established when the user created an account, as described above with respect to FIG. 5.

The user may view current magazine selections associated with the user account (step 620). For example, the user may see that three magazines are associated with her user account: (1) Time™, (2) People™, and (3) Fortune™. The user may decide to change subscription options associated with the account (step 630), for example by changing a magazine package tier service level (described in more detail below with respect to FIG. 7), adding magazine titles to the account, deleting magazine titles from the account, modifying mailing addresses, adding recipients, changing billing information, or canceling magazine subscriptions associated with the account (step 635).

The user may also select at least one magazine as a substitute for a magazine in the user's magazine package. The user-selected substitute magazines may be viewed on a Substitutes List. If one of the magazines in the user's magazine package is not published in a given month, the user may receive a magazine from the user's Substitutes List. The user may create a Substitutes List and add magazines to the Substitutes List immediately upon creating an account or at any point afterwards.

When the flexible magazine management service receives a request from the user to change from a selected magazine to a newly selected magazine, the flexible magazine management service disables distribution of the one selected magazine and enables distribution of the newly selected magazine to the user according to a publication frequency corresponding to the newly selected magazine. Further, the user may suspend delivery of all magazines ordered through the magazine subscription management service for at least one delivery period.

FMM website 230 may provide an order-by date and a corresponding estimated delivery date for an issue of one of the magazines selected by the user. The user may select an issue of a magazine by the order-by date in order to receive delivery of the selected issue on or about the estimated delivery date. FMM website 230 may provide an editorial calendar, wherein the user may sort magazines, e.g., by month, title, etc. The user may select a subset of the number of issues in the period for delivery using the editorial calendar. The user may also reserve future issues of a magazine and select non-sequential issues of a magazine through the editorial calendar. The selected issue or subset of issues, including reserved future issues and non-sequential issues, of each of the selected magazines, is then delivered in accordance with the corresponding publication frequency.

In certain embodiments, the user may request a sample issue of a magazine (step 640). For example, a user requests to sample new magazines that she has never subscribed to before. The user may sample magazines at no cost, or for an additional cost, for example for a fee less than the subscription cost of the new magazine.

In one embodiment, each flexible magazine management account may include a wish list. If the user desires a free issue, the user may add a magazine issue to a wish list (step 645), and each month, the user may receive a free issue, for example, corresponding to the issue at the top of the wish list. In one embodiment, FMM system 150 may automatically add new issues to the user's wish list, for example, recommendations based on previous orders, current orders, household orders, or characteristics of the user (e.g., age, gender, or occupation). In one embodiment, users may submit demographic surveys, which FMM system 150 may use to select issues for the user's wish list. In other embodiments, magazine companies may send free issues to users who subscribe to titles associated with the companies, for example for promotional purposes. The flexible magazine management service may, in some embodiments, notify users about which issues, including which sample issues, they will receive next, and the estimated arrival date of the issues, for example via e-mail. The user may be provided an incentive to refer the flexible magazine management service to other users. The incentive may include, for example, a number of free magazines from the user's wish list, magazine-related gift items, etc.

From the flexible magazine management website, the user may also change billing information associated with the user account (step 650). For example, the user may change payment options (e.g., credit card information, check card information, or bank account information), billing address, email address, and other billing information (step 655). The user may log out (step 660). In one embodiment, FMM system 150 may send a confirmation email to the user to verify any changes (step 670).

The flexible magazine management service also provides parental control features to allow a user to control access to the user's selected magazines. For example, within a single delivery address, a magazine package may include password-protected access to order certain adult titles and unlimited access to other family-oriented titles in the package.

Figure 7:
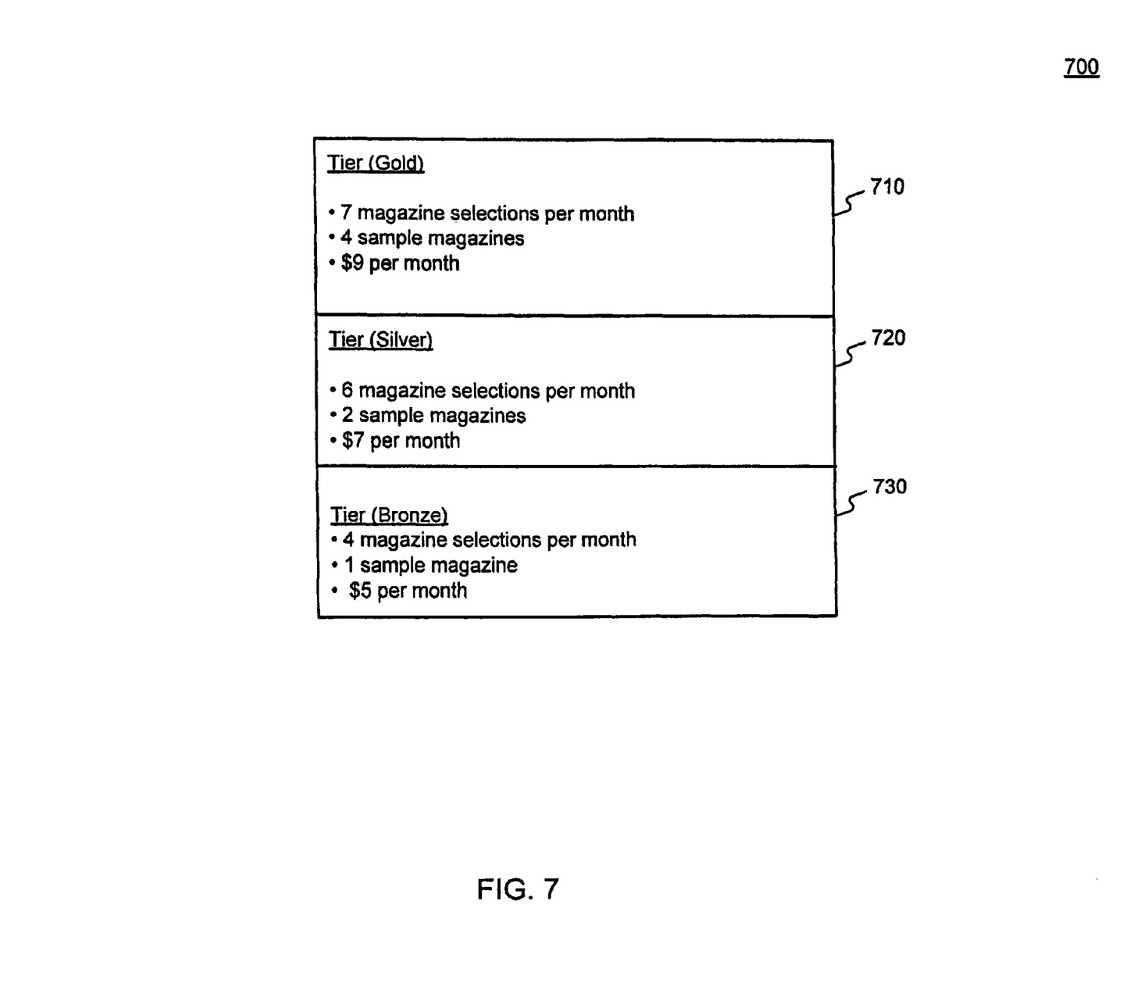
FIG. 7 is a block diagram illustrating an exemplary subscription tier system of the flexible magazine management service of FIG. 1, consistent with embodiments of the present invention.

As described above, users may select magazine package tiers. FIG. 7 illustrates an exemplary subscription tier system 700. Subscription tier system 700 contains three magazine package tiers: Gold 710, Silver 720, and Bronze 730. One skilled in the art will recognize that the use of three tiers is merely for illustration and does not limit the present invention to the use of a particular number of tiers. Tiers 710, 720, and 730 may charge a different price and offer a different level of service. The number of magazines the user receives every month may depend on the tier the user selects. For example, as shown in FIG. 7, tier 710 is $9 per month, and offers eight magazine selections and four free trial issues. Tier 720 is $7 per month, and offers six magazine selections and two free trial issues. Tier 730 is $5 per month, and offers four magazine selections and one free trial issue.

Further, users may be able to switch magazine titles within each tier at any time, using, for example, FMM website 230. A user may, for example, search magazines by title and add or delete magazines within the tier associated with his user account. Further, the user may cancel a subscription to one or more magazines at any time, and may cancel their entire subscription service at any time.

In certain embodiments, each tier may contain certain magazines, based on, for example, distribution period or topic. Tiers may be priced based on the number of magazines within the tier, the distribution period, or other factors. In some embodiments, each tier may entitle a user to receive a certain number of free issues of magazines. In some embodiments, a single magazine package, or tier, may be used instead of multiple tiers with different prices.

Since magazine subscriptions are flexible and may change from period to period as users manage their accounts and tiers, FMM system 150 may identify recipients before distributing magazine issues for each period in order to determine which magazines to send to which recipients each period. FIG. 8 is a flowchart of an exemplary process 800 for identifying recipients for a current period, for example, a week or month. FMM system 150 may search for magazines associated with each active magazine management account (step 810). For example, in the exemplary embodiment shown in FIG. 8, FMM system 150 includes consumers 812, 814, 816, and 818. FMM system 150 may search for all magazines associated with each consumer. Consumer 812 has three magazines (Time™, Sports Illustrated™, and People™) associated with her account. Consumer 814 has two magazines (People™ and Fortune™) associated with her account. Consumer 816 has three magazines (Time™, Fortune™, and Essence™) associated with her account. Consumer 818 has one magazine (Essence™) associated with her account.

FMM system 150 may then determine which magazines to distribute to recipients for the current period (step 820). For example, some magazines may be selected for distribution every week, while other magazines may be selected for distribution only once every four to five weeks. In the exemplary embodiment shown in FIG. 7, Time™, Sports Illustrated™, and People™, are selected for distribution in every week ("Week 1," "Week 2," and "Week 3"), while Fortune™ and Essence™, are selected in "Week 2" and "Week 1," respectively. The time periods for distribution may be determined by, for example, the magazine publisher, FMM system 150, or the consumer. FMM system 150 may determine which magazines to distribute based on an identifier associated with the magazine title or issue stored, for example, in database 260.

After determining which magazines to distribute, FMM system 150 may create a magazine issue label file 835 that can be sent to a fulfillment unit to instruct the fulfillment unit to send the correct magazines to each subscriber (step 830). In certain embodiments, magazine issue label file 835 may include a collection of mailing addresses that are associated with all magazines that will be distributed in the period. As shown in FIG. 7, for the distribution period "Week 1," four magazines, Time™, Sports Illustrated™, People™, and Essence™, are included in file 835, as determined in step 820. Also included in file 835 are the consumers corresponding to the magazines to be distributed, as determined in step 820. In certain embodiments, fulfillment units 170 may be located in different cities, states, regions, or countries, and FMM system 150 may create one magazine issue label file for each fulfillment unit 170.

FMM system 150 may retrieve all mailing addresses for each recipient associated with each magazine to be distributed. For example, subscribers 812 and 816 are associated with Time™ magazine, so FMM system 150 retrieves the mailing addresses for the recipients associated with subscribers 812 and 816 for Time™ magazine.

FMM system 150 may then send magazine issue label file 835 to a distribution service, such as fulfillment unit 170 (step 840), for labeling or distribution. In certain embodiments, process 700 may help to shorten the wait time for a new subscriber to receive the first issue in a subscription, for example, from six or eight weeks to one or two weeks.

Figure 9:
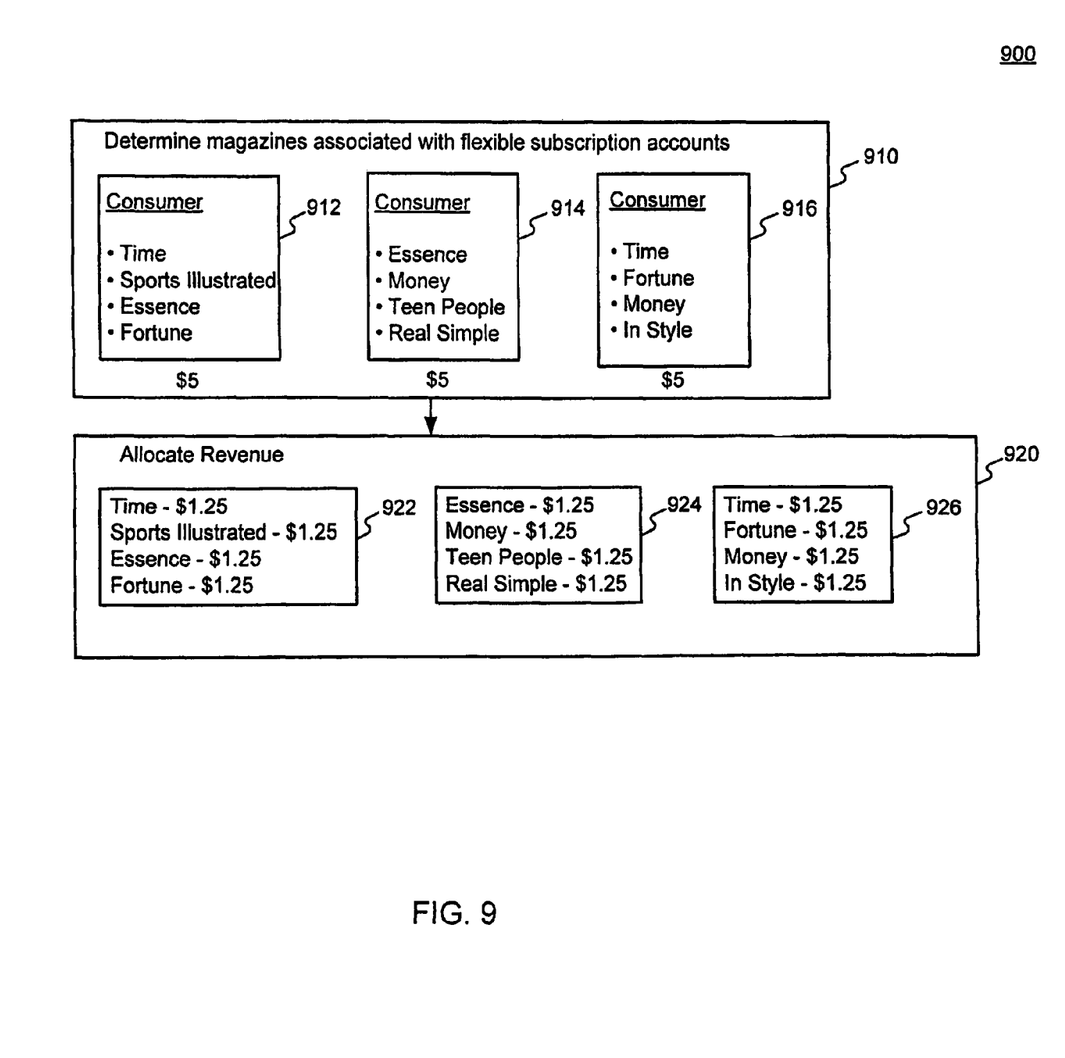
FIG. 9 is a flowchart illustrating an exemplary process of allocating revenue to magazine companies, consistent with embodiments of the present invention.

FIG. 9 is a flowchart of an exemplary process 900 for allocating revenue from a flexible magazine management service. Since magazines that are distributed can change with each distribution period, revenue may be allocated on each distribution period, for example, each week or month. Subscribers, however, may enjoy the ease of paying for all magazines through a recurring flat fee. In this way, the flexible magazine management service may collect a recurring flat fee from each subscriber, (e.g., an annual fee, or a monthly fee), and distribute a portion of the revenue collected from all subscribers to various magazine companies each distribution period (e.g., each week), based on, for example, the number of magazine titles from each company that were distributed in that period.

In one example, FMM system 150 may identify the magazines distributed each period, and allocate a share of revenue to the magazine companies for that period. FMM system 150 may first determine magazines associated with each flexible subscription management account (step 910). For example, FMM system 150 may include consumer 912, 914, and 916. Consumer 912 has Time™, Sports Illustrated™, Essence™, and Fortune™ magazines associated with her account. Consumer 914 has Essence™, Money™, Teen People™, and Real Simple™ magazines associated with her account. Consumer 916 has Time™, Fortune™, Money™, and InStyle™ magazines associated with her account. Consumers 912, 914, and 916 pay fees (e.g., $5 per month) for the flexible magazine management service. For example, the fees may be set according to the tiers shown in FIG. 7.

Based on the number of magazines and the associated fees, FMM system 150 may calculate the appropriate share of revenue due to the magazines associated with each of the user accounts (step 920). For example, in the exemplary embodiment shown in FIG. 9, consumer 912 pays $5 to receive four magazines (Time™, Sports Illustrated™, Essence™, and Fortune™). In this example, each of the four magazines may receive equal shares of the fee (i.e., one quarter of the fee, or $1.25). In another embodiment, magazines may receive different shares, based on, for example, subscription duration, periodic distribution, or other magazine characteristics. In yet another embodiment, revenue may be calculated for each magazine based on, for example, the number of recipients during a specific period.

FMM system 150 may allocate the revenue to each magazine company based on its calculated share. Once revenue is allocated, magazine companies or publishers may receive their calculated share. FMM system 150 may generate reports based on the revenue allocation, for example each distribution period, and the reports may be used for auditing and accounting. One skilled in the art will recognize that FMM system 150 may collect various fees from each consumer and may distribute revenue to magazine companies at any time.

The flexible magazine management service may collect user demographic data for single issue magazine sales based on the distribution of single issues to the user, and may provide the collected data to an auditing agency. The collection of accurate single issue sales would support more complete auditing, more accurate advertising information, etc. The flexible magazine management service may also collect market research data on users, and the market research data may then be sold to third parties.

Advertisements and information may be presented to the user in video format within the magazine subscription management service, by, e.g., embedded video player, streaming video, or downloadable video files.

The flexible magazine management service may supply other products, such as newspapers, books, household goods, and other products, for example, any products purchased on a regular basis. Users may purchase products associated with a magazine via the flexible magazine management service. Users may also purchase magazine content in electronic form via the flexible magazine management service. Further, a consumer may order and receive magazine-specific digital content related to the consumer's magazine package. Other embodiments of the invention will be apparent to those skilled in the art from consideration of the specification and practice of the invention disclosed herein. For example, consumers may use the flexible magazine management service to send gifts, read excerpts of magazines, view upcoming special issues, rate magazines, or chat about magazines. It is intended that the specification and examples be considered as exemplary only, with a true scope and spirit of the invention being indicated by the following claims.

What is claimed is:

1. A method for managing a magazine management service, comprising:
 associating a magazine package with a user, wherein the magazine package includes a set number of different magazine titles and a periodic fee;
 receiving, by a computer, selections for the number of magazine titles to include in the magazine package from the user, each selected magazine title having a corresponding publication frequency including a number of issues and a period for delivery;

processing purchase of the magazine package based on the periodic fee without establishing subscription contracts to the selected magazine titles;

enabling distribution of issues of each of the selected magazine titles according to the corresponding publication frequency;

providing an order-by date and a corresponding estimated delivery date for an issue of one of the magazine titles selected by the user, and when the user selects the issue by the order-by date, enabling delivery of the issue to the user on or about the corresponding estimated delivery date.

2. A method for managing a magazine management service, comprising:

associating a magazine package with a user, wherein the magazine package includes a set number of different magazine titles and a periodic fee;

receiving, by computer, selections for the number of magazine titles to include in the magazine package from the user, each selected magazine title having a corresponding publication frequency including a number of issues and a period for delivery;

processing purchase of the magazine package based on the periodic fee without establishing subscription contracts to the selected magazine titles;

receiving from the user a selection of a subset of the number of issues in the period for delivery, and enabling distribution of the selected subset of issues of each of the selected magazine titles according to the corresponding publication frequency.

3. The method of claim 1, further comprising:
providing the user with access to customer service of the flexible magazine management service by electronic means.

4. The method of claim 1, further comprising:
enabling the user to submit reviews of a magazine title managed by the flexible magazine management service, and
enabling the user to read reviews submitted by other users.

5. The method of claim 1, further comprising:
providing the user with an incentive to refer the flexible magazine management service to other users,
wherein the incentive may include a number of free magazine titles from the user's wish list.

6. The method of claim 1, further comprising:
enabling the user to search for magazine titles based on criteria including at least one of title, price, publication frequency, and content.

7. The method of claim 1, further comprising:
collecting user demographic data for single issue magazine sales based on the distribution of issues to the user, and
providing the collected data to an auditing agency.

8. The method of claim 1, further comprising:
allowing the user to purchase products associated with a magazine title via the flexible magazine management service; and
allowing the user to purchase magazine content in electronic form via the flexible magazine management service.

9. The method of claim 1, further comprising:
allowing the user to order and receive magazine-specific digital content related to the user's magazine package.

10. The method of claim 1, further comprising:
collecting market research data on a user using the flexible magazine management service.

11. The method of claim 1, further comprising:
providing the user with parental control features to control access to the user's selected magazine titles.

12. The method of claim 1, further comprising:
providing the user with wireless account management of the flexible magazine management service,
wherein a user account may be accessed by devices including at least one of a cell phone, personal data assistant, and smart phone.

13. The method of claim 1, wherein the user may select at least one magazine title as a substitute for a magazine title in the user's magazine package.

14. The method of claim 1, wherein the user may suspend delivery of all magazine titles ordered through the flexible magazine management service for at least one delivery period.

15. The method of claim 1, wherein advertisements and information may be presented to the user in video format within the flexible magazine management service, by at least one of an embedded video player, streaming video, and downloadable video files.

16. The method of claim 1, further comprising:
calculating revenue shares for each magazine title in the magazine package;
allocating the revenue shares;
generating reports based on revenue allocation; and
performing at least one of auditing and accounting based on the revenue allocation reports.

* * * * *